United States Patent

Yiu et al.

[11] Patent Number: 5,890,799
[45] Date of Patent: Apr. 6, 1999

[54] METHOD FOR REDUCING POWER CONSUMPTION IN A PORTABLE ELECTRONIC DEVICE WITH A LIQUID CRYSTAL DISPLAY SCREEN

[75] Inventors: Hing Leung Yiu, Tsuen Wan NT; Harvey Wong, Kowloon, both of Hong Kong; Wendy Reed, Austin, Tex.

[73] Assignee: Motorola Inc., Austin, Tex.

[21] Appl. No.: 966,831

[22] Filed: Nov. 10, 1997

Related U.S. Application Data

[63] Continuation of Ser. No. 443,803, May 18, 1995, abandoned.

[51] Int. Cl.$^6$ .................................................... G06F 1/00
[52] U.S. Cl. ................ 364/707; 395/750.04; 395/750.05
[58] Field of Search .............................. 364/707; 395/560, 395/750.01–750.08; 345/90, 206, 207; 327/143

[56] References Cited

U.S. PATENT DOCUMENTS

| | | | |
|---|---|---|---|
| 4,345,248 | 8/1982 | Togashi et al. ........................... 345/90 |
| 4,419,917 | 12/1983 | Sato .......................................... 84/653 |
| 4,598,383 | 7/1986 | Leach .................................. 395/750.01 |
| 4,839,634 | 6/1989 | More et al. ............................. 345/173 |
| 4,851,987 | 7/1989 | Day ........................................ 395/560 |
| 4,980,836 | 12/1990 | Carter et al. ....................... 395/750.04 |
| 5,167,024 | 11/1992 | Smith et al. ........................ 395/750.04 |
| 5,203,000 | 4/1993 | Folkes et al. ....................... 395/750.08 |
| 5,243,332 | 9/1993 | Jacobson ................................. 345/44 |
| 5,371,693 | 12/1994 | Nakazoe .................................. 364/707 |
| 5,396,635 | 3/1995 | Fung .................................. 395/750.05 |
| 5,475,654 | 12/1995 | Furmura et al. .......................... 368/10 |
| 5,485,625 | 1/1996 | Gumkowski ....................... 395/750.05 |
| 5,488,575 | 1/1996 | Danielson et al. ...................... 364/707 |
| 5,568,409 | 10/1996 | Neoh ...................................... 364/707 |
| 5,590,343 | 12/1996 | Bolan et al. ....................... 395/750.01 |

FOREIGN PATENT DOCUMENTS

| | | |
|---|---|---|
| 487 049 A1 | 5/1992 | European Pat. Off. . |
| 626 633 A1 | 11/1994 | European Pat. Off. . |
| 7056685 | 3/1995 | Japan . |

OTHER PUBLICATIONS

IBM Corp; "Screen Programmable Power On Off Switch for Personal Computers", IBM Technical Disclosure Bulletin, pp. 157–158 (1993).

*Primary Examiner*—Emmanuel L. Moise

[57] ABSTRACT

A method and apparatus for reducing power consumption in a portable electronic device (100) with an LCD screen (104) and operating with a CPU (114) switchable between a high power mode and a low power mode. When input commences on a surface of the LCD screen (104), an interrupt signaler (108) generates a first interrupt signal to an interrupt controller (112). Upon receiving the first interrupt signal, the interrupt controller (112) switches the CPU (114) from the low power mode to the high power mode, turning on at least one detection panel (106) coupled to the LCD screen (104) and to an ADC (110). When input ceases on the surface, the interrupt signaler (108) generates a second interrupt signal to switch the CPU (114) from the high power mode to the low power mode, turning off the at least one detection panel (106) and the ADC (110).

7 Claims, 4 Drawing Sheets

5,890,799

METHOD FOR REDUCING POWER CONSUMPTION IN A PORTABLE ELECTRONIC DEVICE WITH A LIQUID CRYSTAL DISPLAY SCREEN

This application is a continuation of prior patent application Ser. No. 08/443,803 filed May 18, 1995, now abandoned.

FIELD OF THE INVENTION

This invention relates in general to liquid crystal display screens used in portable electronic devices for receiving inputs and displaying outputs, and more particularly, to a method for reducing power consumption in a portable electronic device receiving inputs from a liquid crystal display screen.

BACKGROUND OF THE INVENTION

A portable electronic device, such as a selective call receiver or a cellular telephone, typically has a liquid crystal display (LCD) screen for displaying visual information. Conventionally, the visual information is obtained from processing data received from input devices such as a keyboard. It is also common to use the LCD screen as an input device in order to reduce space required by the keyboard and to make the portable electronic device easier to use.

Receiving inputs from an LCD screen require detection panels on the LCD screen to sense, for example, movements of a stylus-shaped apparatus inscribing information on the surface of the LCD screen. These movements, converted to voltage or pressure variations by electronic circuitry coupled to the detection panels, are typically processed by an analog to digital converter (ADC) to provide data for deriving the visual information.

Conventionally, a controller within the portable electronic device is dedicated to control the detection panels and the circuitry coupling to the detection panels. The controller sets the detection panels and the electronic circuitry to scan the LCD screen at a predetermined sampling frequency. As is known in the art, scanning in portable electronic devices unnecessarily consumes power when no inputs are received. Furthermore, as portable electronic devices operate with batteries having limited energy content, reducing or eliminating unnecessary power consumption prolongs the operating duration of such portable electronic devices.

Thus, what is needed is a method for an LCD screen to detect inputs efficiently and thereby reduce power consumption in a portable electronic device with the LCD screen.

SUMMARY OF THE INVENTION

In carrying out the objects of the present invention in one form, there is provided a portable electronic device comprising a liquid crystal display screen having a surface for receiving inputs and coupled to at least one detection panel for detecting the inputs on the surface. The portable electronic device further comprises an analog to digital converter for converting the inputs to digital signals and a central processing unit, operating at either a high power mode or a low power mode, wherein the central processing unit activates the at least one detection panel and the analog to digital converter in the high power mode. The central processing unit comprising an interrupt signaler, coupled to a bus and to the at least one detection panel, for generating a first interrupt signal on the bus when input commences on the surface. The central processing unit further comprises an interrupt controller, coupled to the bus, for switching the central processing unit from operating at the low power mode to the high power mode in response to reception of the first interrupt signal on the bus.

DETAILED DESCRIPTION OF THE INVENTION

Figure 1:
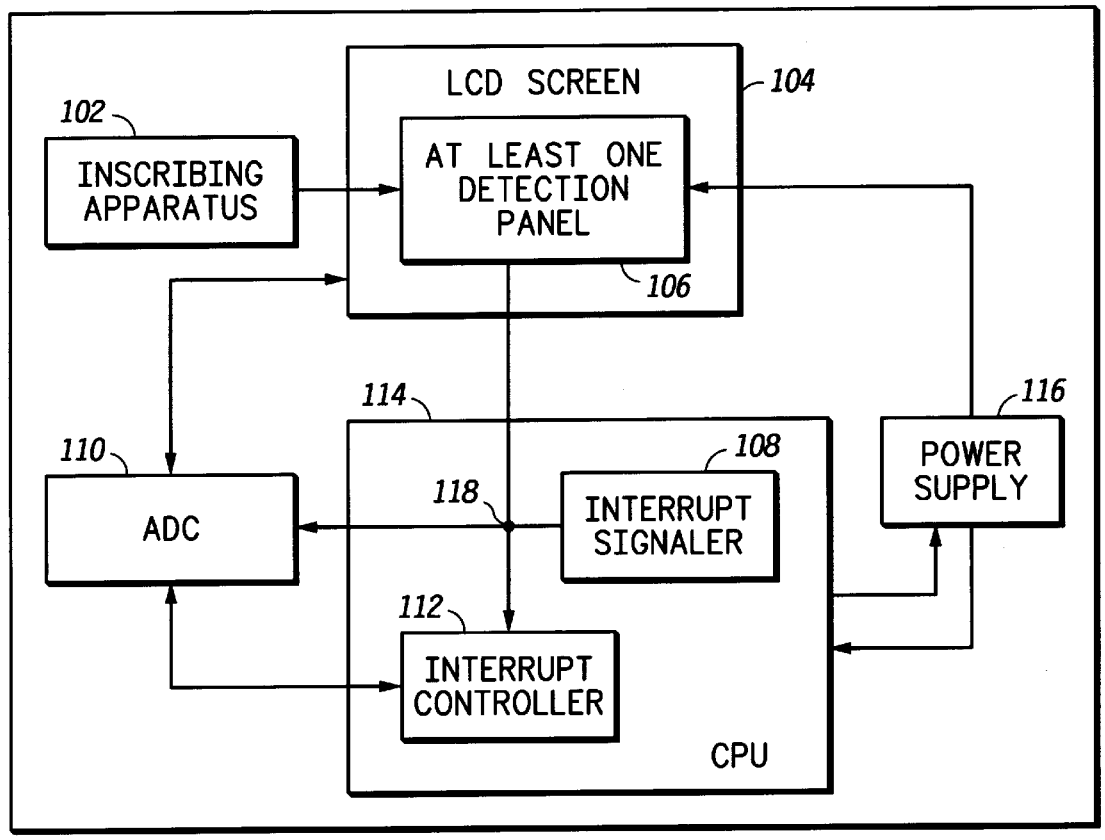
FIG. 1 is a block diagram of a portable electronic device having a liquid crystal display in accordance with a preferred embodiment of the present invention.

In accordance with a preferred embodiment of the present invention, FIG. 1 shows a block diagram of a portable electronic device 100. The portable electronic device 100 comprises a liquid crystal display (LCD) screen 104 having a surface for receiving inputs, an analog to digital converter (ADC) 110 for converting the inputs to digital signals, and a central processing unit (CPU) 114. Within the LCD screen 104, at least one detection panel 106 for detecting the inputs is coupled to the surface. Detection panels are commonly coated with resistive materials to enable determination of input locations, as is known in the art.

Switchable to operate at either a low power mode or a high power mode, the CPU 114 activates the at least one detection panel 106 and the ADC 110 when operating at the high power mode. In accordance with the preferred embodiment of the present invention, the CPU 114 comprises an interrupt signaler 108 and an interrupt controller 112. Coupled to a bus 118 and to the at least one detection panel 106, the interrupt signaler 108 generates a first interrupt signal on the bus 118 when input commences on the surface. Thereafter, in response to reception of the first interrupt signal on the bus 118, the interrupt controller 112 switches the CPU 114 from operating at the low power mode to the high power mode.

Advantageously activating the at least one detection panel 106 and the ADC 110 only when input commences substantially reduces power consumption of the portable electronic device 100 in the present invention. Unlike scanning for inputs in prior art detection panels, the at least one detection panel 106 and the ADC 110 of the present invention does not operate when there are no inputs on the surface.

Figure 2:
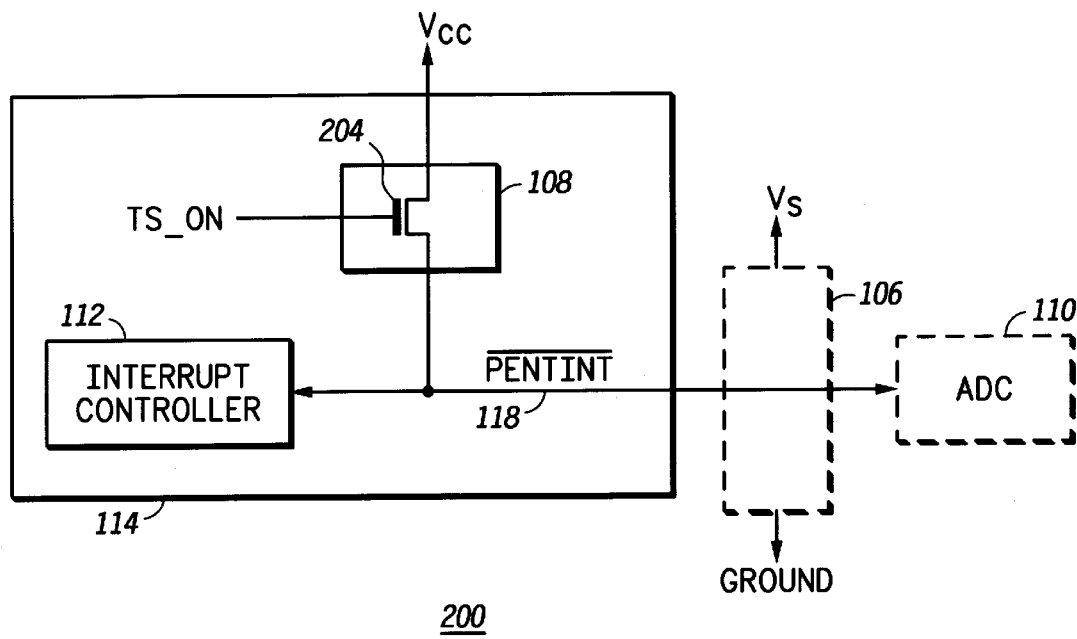
FIG. 2 shows the portable electronic device of FIG. 1 in a low power mode in accordance with the preferred embodiment of the present invention.

FIG. 2 shows the portable electronic device 100 in the low power mode, in accordance with the preferred embodiment of the present invention. In the low power mode, the bus 118 couples together the interrupt controller 112, the ADC 110, the at least one detection panel 106, and the interrupt signaler 108. Comprising a transistor 204 with a finite resistance when active, the interrupt signaler 108 maintains the bus 118, referenced as $\overline{PENINT}$, to a high logic level. With no inputs, the at least one detection panel 106 and the ADC 110 are not activated. The transistor 204, for example, a P-channel junction field effect transistor (JFET), is kept active by a signal, Ts_On, from the CPU 114.

Figure 3:
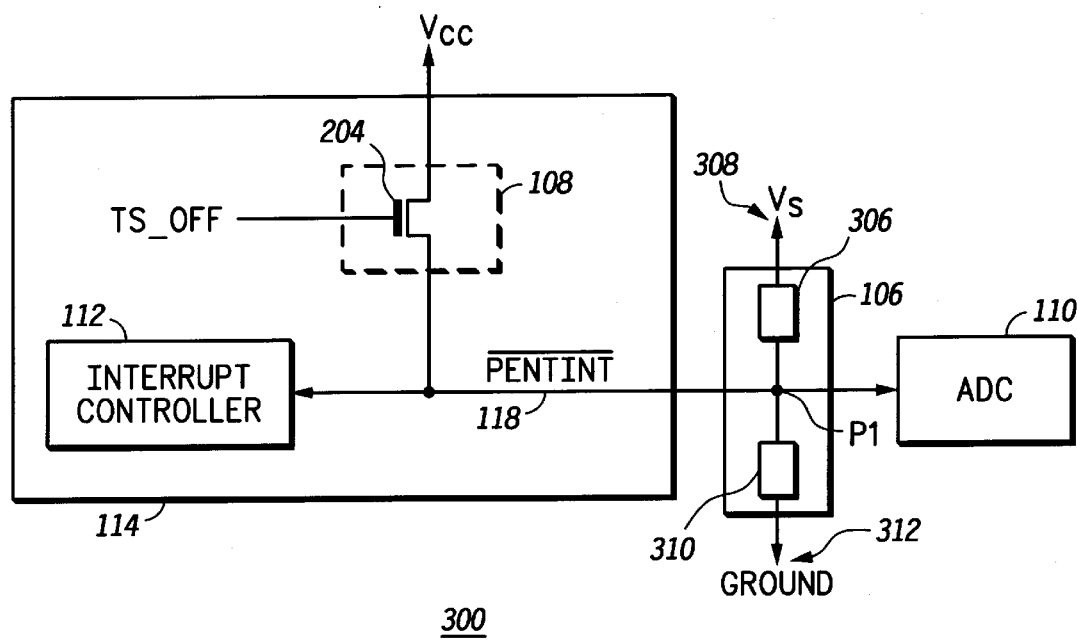
FIG. 3 shows the portable electronic device of FIG. 1 in a high power mode in accordance with the preferred embodiment of the present invention.

FIG. 3 shows the portable electronic device 100 in the high power mode, in accordance with the preferred embodiment of the present invention. The high power mode begins when, for example, contact with the surface of the LCD screen 104 is made by an inscribing apparatus 102 at a point, P1. With this contact, the at least one detection panel 106 forms an equivalent resistive network at P1 as a result of resistive characteristics of the at least one detection panel 106. Hence, as shown in FIG. 3 in accordance with the preferred embodiment of the present invention, the equivalent resistive network provides a first resistor 306 between P1 and a first end 308 of the at least one detection panel 106 and a second resistor 310 between P1 and a second end 312 of the at least one detection panel 106. Typically, the first end 308 and the second end 312 will connect to a ground node and a positive power node ($V_s$) of a power supply 116 when activated, and therefore, before activation of the power supply 116, connection to the ground node provides a potential divider between the finite resistance of the transistor 204 and the second resistor 310. When the finite resistance of the transistor is controlled to be at least ten times the resistance of the second resistor 310, the resulting voltage on the bus 118 is sufficiently low to set $\overline{PENINT}$ to a low logic level. A typical value of the second resistor 310 ranges from zero ohms to a maximum of about five hundred ohms for the at least one detection panel 106, depending on the location of P1 on the surface of the LCD screen 104. Hence, setting $\overline{PENINT}$ to low provides the first interrupt signal to the interrupt controller 112 to switch the CPU 114 from operating at the low power mode to the high power mode.

Figure 4:
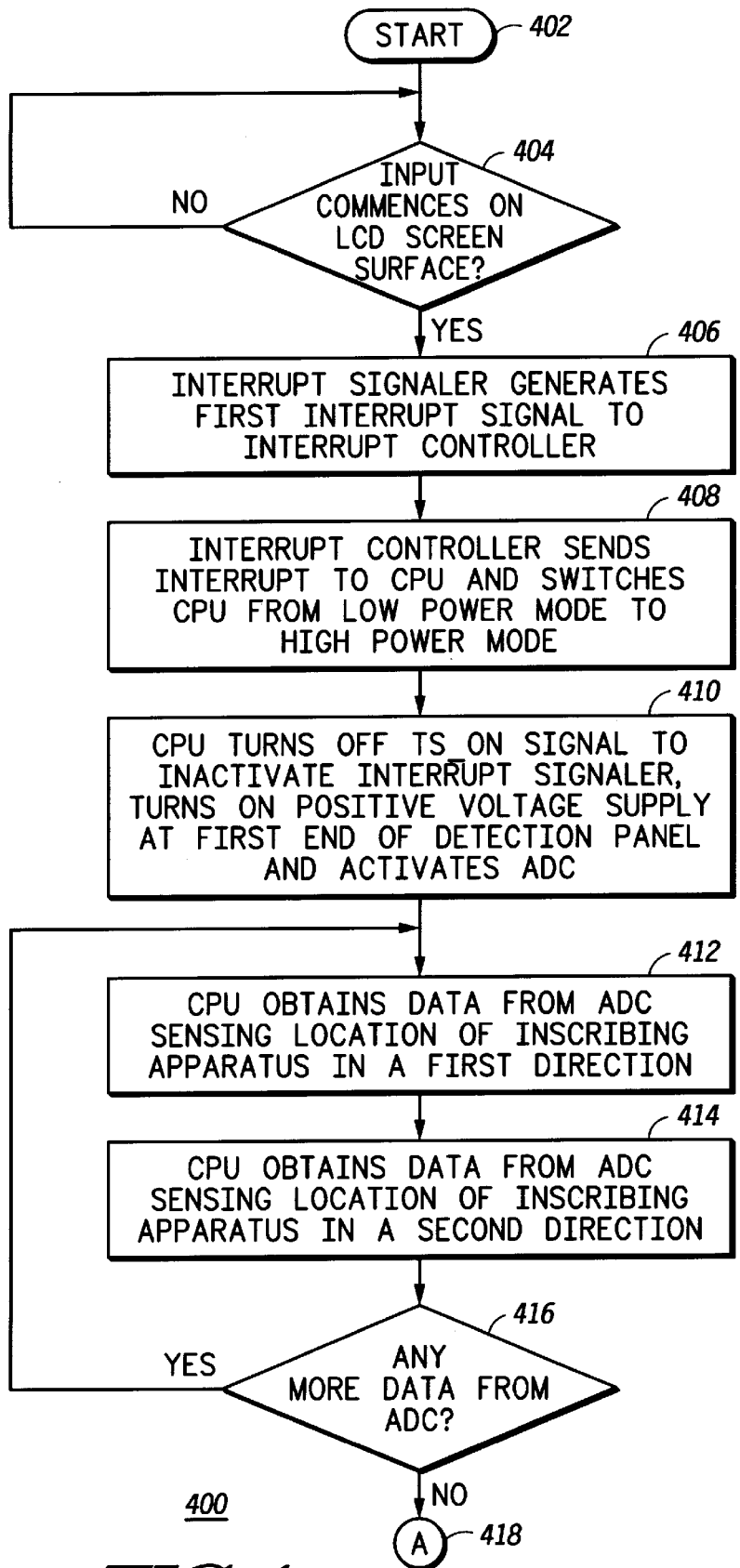
FIG. 4 shows a flow diagram for switching to the high power mode of FIG. 3 in accordance with the preferred embodiment of the present invention.

In accordance with the preferred embodiment of the present invention, FIG. 4 shows a flow diagram for a method 400 to activate the high power mode. Starting at step 402, the interrupt signaler 108 determines whether input commences on the surface of the LCD screen 104 at step 404. When input commences, the interrupt signaler 108 generates the first interrupt signal by the potential divider of the finite resistance of the transistor 108 and the second resistor 310 at step 406. In following step 406, the interrupt controller 112 interrupts the CPU 114 at step 408 and switches the CPU 114 from operating at the low power mode to the high power mode. In turn, at step 410, the CPU 114 turns off Ts_On (changing Ts_On in FIG. 2 to Ts_Off in FIG. 3) to inactivate the interrupt signaler 108. This prevents the interrupt signaler 108 from affecting subsequent operations of the at least one detection panel 106 detecting the inputs from the surface of the LCD screen 104. In addition, at step 410, the CPU 114 activates the at least one detection panel 106 and the ADC 100 to receive the inputs by enabling the power supply 116. For the at least one detection panel 106, the first end 308 connects to the positive power node and the second end 312 connects to the ground node.

In accordance with the preferred embodiment of the present invention, in steps 412 and 414 the at least one detection panel comprises a first detection layer detecting the inputs in a first direction and a second detection layer detecting the inputs in a second direction. Detecting the inputs in the first direction and the second direction provides two-axis coordinates for the inputs. At step 416, the CPU 114 determines whether there is any more digital signals from the ADC 110. Following this, at step 418, the CPU 114 prepares to detect whether input ceases on the surface of the LCD screen 104. Otherwise, the CPU 114 continues to process the digital signals.

Figure 5:
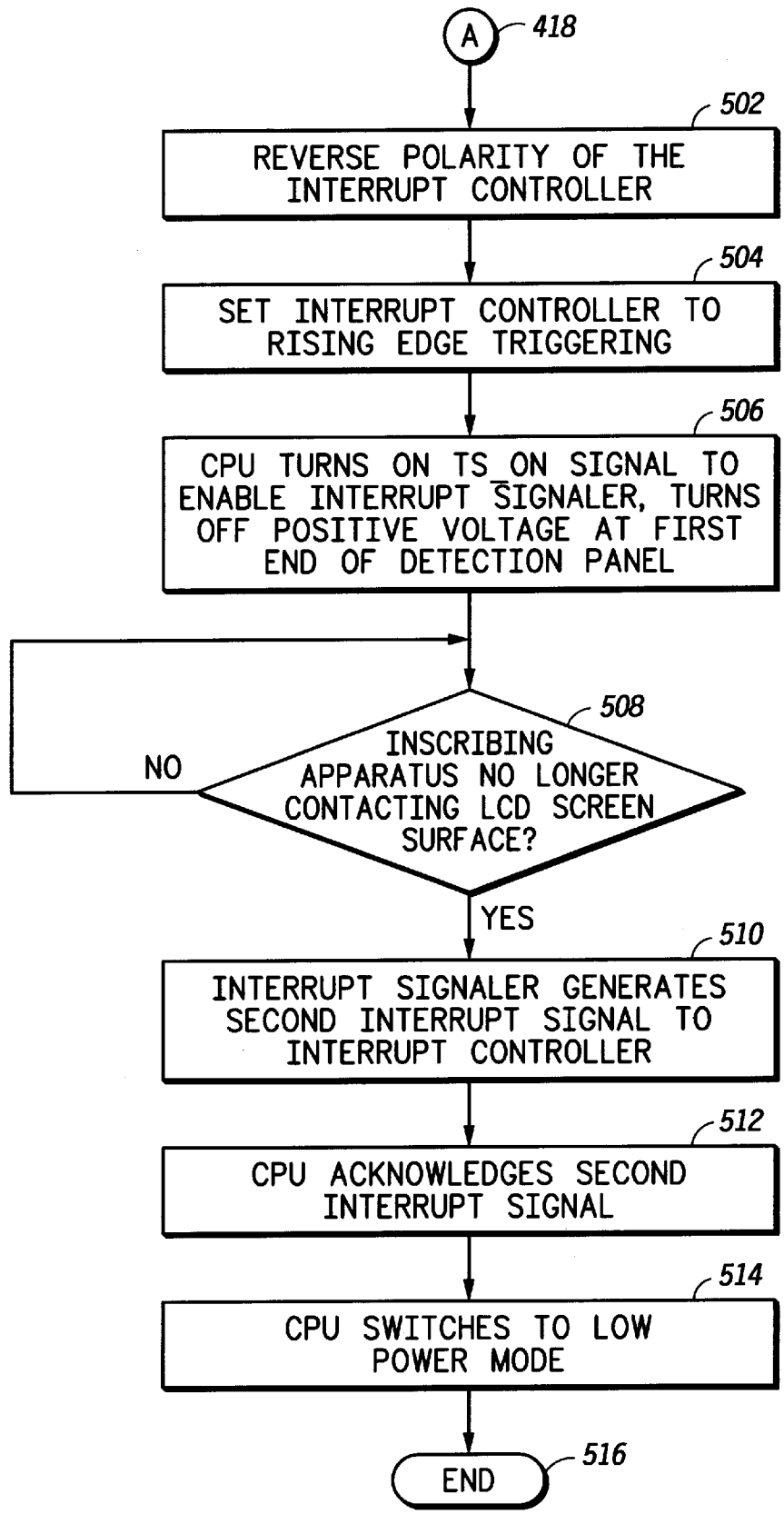
FIG. 5 continues with the flow diagram of FIG. 4 for switching to the low power mode of FIG. 2 in accordance with the preferred embodiment of the present invention.

FIG. 5 continues with the flow diagram for the method 400 to activate the low power mode, in accordance with the preferred embodiment of the present invention. As the interrupt controller 112 now functions to detect an interrupt signal indicating that input ceases, polarity of the interrupt controller 112 is reversed by the CPU 114. Reversing the polarity of the interrupt controller 112 maintains $\overline{PENINT}$ as the bus 118 reference to detect when the input ceases. Following this, at step 504, the interrupt controller 112 is set to a rising edge triggering of the interrupt signal, as opposed to a falling edge triggering for the first interrupt signal when input commences. At step 506, the CPU 114 turns on TS_Off (changing TS_Off in FIG. 3 to TS_On) and disables the power supply 116 connected to the first end 308 of the at least one detection panel 106. Disabling the power supply 116 to the first end 308 stops the scanning of the at least one detection panel 106. Next, at step 508, the CPU 114 determines whether the inscribing apparatus 102 is no longer contacting the surface of the LCD screen 104. When the inscribing apparatus 102 is not contacting the surface, the interrupt signaler 108 generates a second interrupt signal to the interrupt controller 112 at step 510. The second interrupt signal is generated by the finite resistance of the transistor 204 pulling up the bus 118 to the high logic level. Hence, by a logic change of the bus 118 changing from the low logic level to the high logic level, $\overline{PENINT}$ is set to high by the rising edge of the logic change. Upon acknowledging the second interrupt signal in step 512, the CPU 114 switches to the low power mode in step 514. Thus, with the CPU 114 now in a low power mode, the method 400 ends.

Advantageously switching between the high power mode and the low power mode provides the portable electronic device 100 in the present invention substantial savings in power consumption. The present invention activates the ADC 110 and the at least one detection panel 106 only after determining that there are inputs from the surface of the LCD screen 104. When processing the inputs, the present invention further determines when input ceases in order to inactivate the ADC 110 and the at least one detection panel 106. Thus, the present invention eliminates unnecessary scanning for inputs when the inscribing apparatus 102 is not providing any inputs through the LCD screen 104.

By now it should be appreciated that there has been provided a method and apparatus for reducing power consumption in a portable electronic device 100 with a liquid crystal display screen 104.

We claim:

1. A portable electronic device having a liquid crystal display screen wherein the portable electronic device receives inputs from a surface of the liquid crystal display screen further wherein the liquid crystal display screen includes at least, the portable electronic device comprising:

a central processing unit;

an interrupt signaler, including at least one detection panel of the liquid crystal display screen and a transistor, coupled to a bus, wherein the interrupt signaler generates a first interrupt signal on the bus when input commences on the surface and generates a second interrupt signal on the bus when input ceases on the surface, as detected by the at least one detection panel, and wherein the interrupt signaler is activated when the transistor is switched to a first logic state; and an interrupt controller, coupled to the bus, for switching the central processing unit from operating at a low power mode to a high power mode in response to reception of the first interrupt signal on the bus and for switching the central processing unit from operating at a high power mode to a low power mode in response to reception of the second interrupt signal on the bus.

2. The portable electronic device of claim 1 wherein the transistor is a P-channel junction field effect transistor.

3. A portable electronic device comprising:

a liquid crystal display screen having a surface for receiving inputs and coupled to at least one detection panel for detecting the inputs on the surface;

an analog to digital converter for converting the inputs to digital signals; and a central processing unit, operating at either a high power mode or a low power mode, wherein the central processing unit activates the at least one detection panel and the analog to digital converter in the high power mode, the central processing unit comprising:

a transistor, coupled to a bus and to the at least one detection panel, for generating a first interrupt signal on the bus when input commences on the surface and for generating a second interrupt signal on the bus when input ceases on the surface; and an interrupt controller, coupled to the bus, for switching the central processing unit from operating at the low power mode to the high power mode in response to reception of the first interrupt signal on the bus and for switching the central processing unit from operating at a high power mode to a low power mode in response to reception of the second interrupt signal on the bus.

4. The portable electronic device of claim 3 wherein the transistor is a P-channel junction field effect transistor.

5. The portable electronic device of claim 3 wherein the at least one detection panel comprises a first detection layer detecting the inputs in a first direction.

6. The portable electronic device of claim 5 wherein the at least one detection panel further comprises a second detection layer detecting the inputs in a second direction.

7. A method for reducing power consumption in a portable electronic device wherein the portable electronic device includes a central processing unit operating at either a low power mode or a high power mode, a liquid crystal display screen having a surface for receiving inputs detected by at least one detection panel, and an analog-to-digital converter for converting the inputs to digital signals, the method comprising the steps of:

generating a first interrupt signal when input commences on the surface, wherein the first interrupt signal is generated by an interrupt signaler within the central processing unit coupled to the surface;

switching the central processing unit from the low power mode to the high power mode in response to reception of the first interrupt signal, wherein, while operating in the high power mode, the central processing unit inactivates the interrupt signaler, activates the at least one detection panel and the analog to digital converter to receive the inputs, and reactivates the interrupt signaler when the central processing unit is processing the received inputs;

generating a second interrupt signal in response to voltage variation on a node within the interrupt signaler caused by the input ceasing on the surface, wherein the first interrupt signal is generated by the interrupt signaler; and switching the central processing unit from the high power to the low power mode and inactivating the at least one detection panel and the analog to digital converter, in response to the second interrupt signal.

* * * * *